United States Patent [19]
Pfister

[11] 4,373,447
[45] Feb. 15, 1983

[54] RAIL VEHICLE PASSENGER BODY

[75] Inventor: Johann K. Pfister, Dietlikon, Switzerland

[73] Assignee: Schweizerische Lokomotiv und Maschinenfabrik, Winterthur, Switzerland

[21] Appl. No.: 105,867

[22] Filed: Dec. 21, 1979

Related U.S. Application Data

[63] Continuation of Ser. No. 832,898, Sep. 13, 1977, abandoned.

[30] Foreign Application Priority Data

Sep. 16, 1976 [CH] Switzerland .................. 11730/76

[51] Int. Cl.³ .............. B61D 1/00; B61D 17/10; B61D 17/12
[52] U.S. Cl. .................. 105/399; 105/400; 105/414; 105/453
[58] Field of Search .............. 105/26 R, 101, 314, 105/329 R, 331, 332, 396, 397, 399, 400, 401, 414, 416, 418, 453; 410/6

[56] References Cited

U.S. PATENT DOCUMENTS

| | | | |
|---|---|---|---|
| 384,225 | 6/1888 | Zürcher | 105/399 |
| 401,529 | 4/1889 | Zurcher | 105/414 X |
| 847,503 | 3/1907 | Ostrander | 105/401 |
| 1,259,192 | 3/1918 | Abbe | 105/401 X |
| 1,703,462 | 2/1929 | Tittelbach | 105/399 |
| 2,035,113 | 3/1936 | Blomberg | 105/418 |
| 2,256,883 | 9/1941 | Trautvetter | 105/401 |
| 2,882,835 | 4/1959 | Buchanan | 105/314 |
| 3,896,739 | 7/1975 | Crofts | 105/401 X |

Primary Examiner—Joseph F. Peters, Jr.
Assistant Examiner—Howard Beltran

[57] ABSTRACT

The rail vehicle body is constructed such that the base, roof and a centrally located bearing frame define a unitary bearing section member. The bearing frame may be composed of pairs of vertically stiffened walls, rows of vertically disposed posts, and one or more lattice girders. The side walls of the vehicle body are removably mounted so that ready access can be made to the chambers defined on opposite sides of the load-bearing frame. In addition, the load-bearing frame or frames are provided with apertures to provide access between the chambers on opposite sides of the bearing frame. Also, a drive means for driving the wheels of the vehicle body can be suspended from transverse girders forming the base of the vehicle body.

11 Claims, 8 Drawing Figures

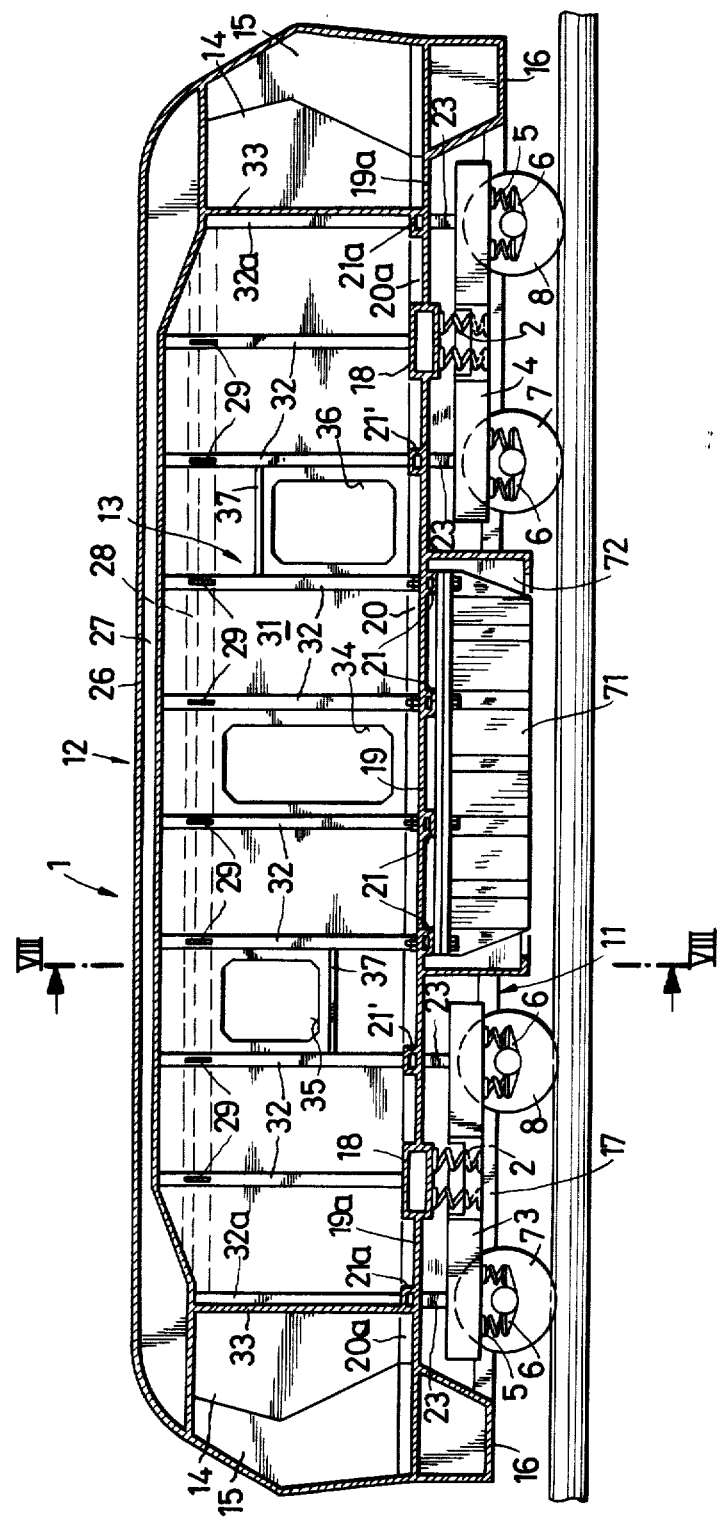

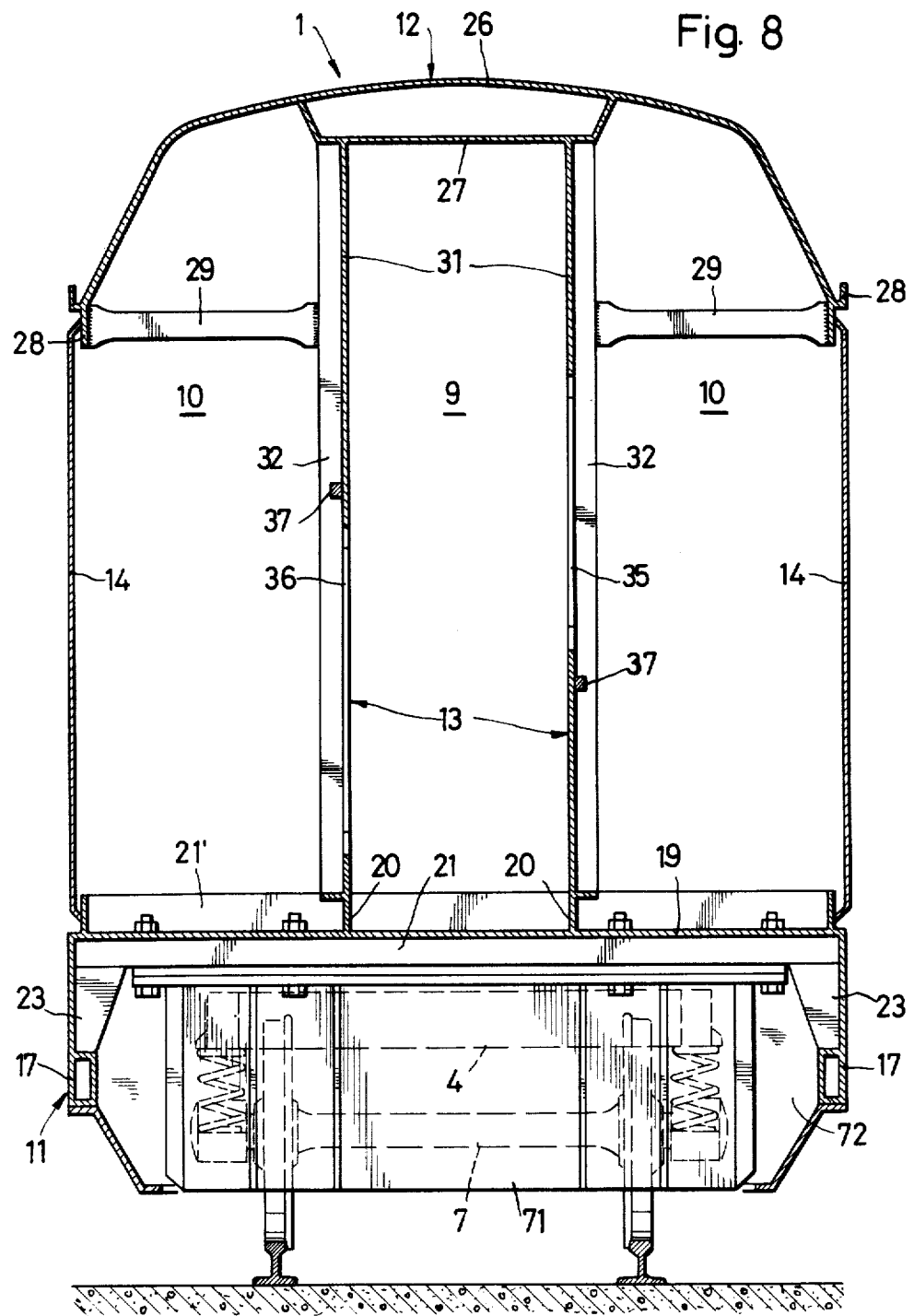

RAIL VEHICLE PASSENGER BODY

This application is a continuation of Ser. No. 832,898, filed Sept. 13, 1979, now abandoned.

This invention relates to a rail vehicle body. More particularly, this invention relates to a rail vehicle body construction.

Heretofore, it has been known to construct a rail vehicle body on either a bridge basis or a tube basis. In the first case, the parts of the body are mounted on a load bearing base construction. In the latter case, the vehicle body has a base, a roof and side walls which cooperate to form a self-supporting unit. The tube construction is much lighter than the bridge construction but suffers from the disadvantage that, for example, in the case of rail traction vehicles, relatively large components such as traction units have to be introduced into the vehicle body through apertures in the roof so that the load bearing side walls are not reduced excessively by fitting apertures.

Accordingly, it is an object of the invention to provide a rail vehicle body which is constructed in a light weight manner and which has easy access to the operative area of the vehicle body.

It is another object of the invention to permit a side fitting of traction equipment into a rail vehicle body without impairment of the stability of the vehicle body.

Briefly, the invention provides a rail vehicle body which is comprised of a base, a roof, at least one load bearing-frame secured to and between the base and the roof and a pair of non-load bearing side walls. The bearing frame is disposed within the middle third of the rail vehicle body width and extends longitudinally of the body. The base, roof and bearing frame thus define a unitary bearing section member. The side walls are disposed between the base and roof longitudinally of the rail vehicle body and are mounted so as to be removed or otherwise opened to provide access into the interior of the rail vehicle body.

The body is constrcted so that the load bearing frame and side walls define at least a pair of chambers which are disposed on opposite sides of the bearing frame. In addition, the bearing frame is provided with apertures to form passage and/or service apertures in order to communicate the chambers with each other.

The bending and torsional stresses to be received are the only factors determining the construction of the load-bearing frame. Further, the construction of the rail vehicle allows the use of non-load-bearing side walls of relatively light weight construction which may be divided into discrete removable elements. This allows a side fitting of traction equipment which has, for example, been subdivided into appropriate units, without any impairment of the stability of the rail vehicle.

In one embodiment, the bearing frame is formed, in part, of a vertically disposed wall which is connected to the base and to the roof. In this case, the wall can extend over the longitudinal region of the vehicle body in the manner of a continous web of a solid wall girder. In this case, the wall can be stiffened by various means and can be provided with apertures at suitable locations to provide access to and between the passage upon opposite sides of the wall.

In another embodiment, the bearing frame is constructed of a plurality of vertically disposed posts which are disposed in spaced apart relation and which are connected to the base and to the roof in a manner so as to resist bending. In this case, the spaces between the posts can remain clear. Cdorrespondingly, the vehicle body chambers on both sides of the row of posts are open for access from the other chamber substantially over the whole length of the bearing frame.

In another embodiment, the base and roof each include horizontally disposed griders while the bearing frame includes a plurality of struts which interconnect the girders to form a lattice girder. In this case, the struts may all be angularly disposed or angularly and vertically disposed. This bearing frame is distinguished by being opened transversely for access to both sides.

Insofar as torsional stresses are to be received by the vehicle body, pairs of the bearing frames can be disposed in spaced parallel relation. Spacing may be such as to correspond at least to the width of a walkway.

Conveniently, so that the entire roof of the vehicle body is operative as a bearing element over its whole height and width, possibly with associated edge girders, longitudinal air passages, or the like, the roof is connected to the bearing frame by way of a plurality of transversely disposed horizontal stiffening plates. These plates are vertically rigid and stiff and are either made resilient or are resiliently mounted transversely of the bearing frame.

In a further embodiment, the rail vehicle base is formed of transverse girders while a drive means for driving the wheels of the vehicle body is suspended from the transverse girders centrally of the length of the vehicle body. This provides an especially compact construction where the rail vehicle body is to be provided with a traction unit. In this case, the drive means can be located across the width of the vehicle body. This construction is also especially advantageous with respect to A.C. current locomotives in that the required transformers can be mounted across the width of the vehicle in an undivided sub-floor arrangement, and thus outside the vehicle body profile. Further, the sub-floor positioning of the transformers is advantageous for the stability of the vehicle body without impairment of the construction of the vehicle body.

These and other objects and advantages of the invention will become more apparent from the following detailed description and appended claims taken in conjunction with the accompanying drawings in which:

FIG. 7 illustrates a longitudinal cross-sectional view of a rail vehicle body having a part of the traction equipment mounted below the floor of the body in accordance with the invention; and FIG. 8 illustrates a view taken on line VIII—VIII of FIG. 7.

Figure 1:
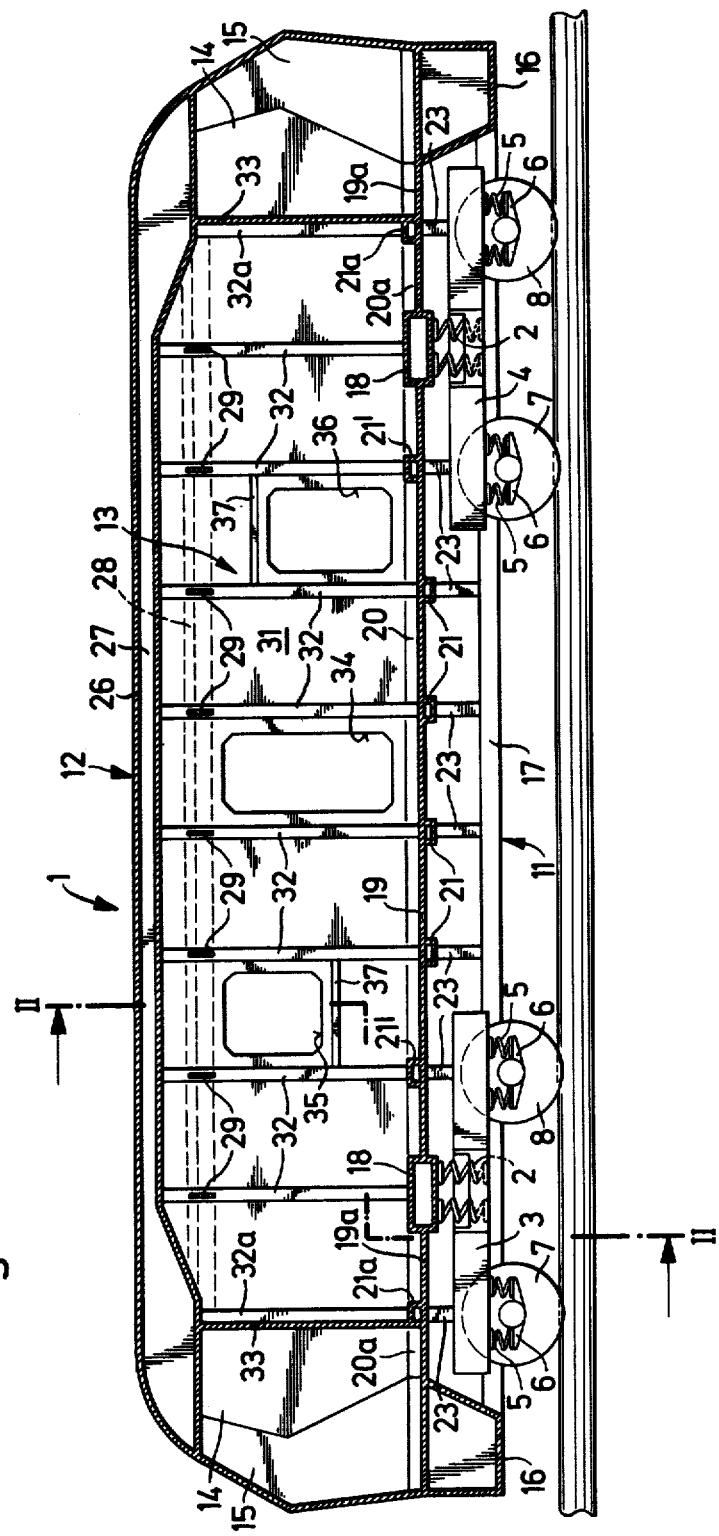
FIG. 1 illustrates a longitudinal cross-sectional view taken on line I—I of FIG. 2 of a rail vehicle body constructed in accordance with the invention.
Figure 2:
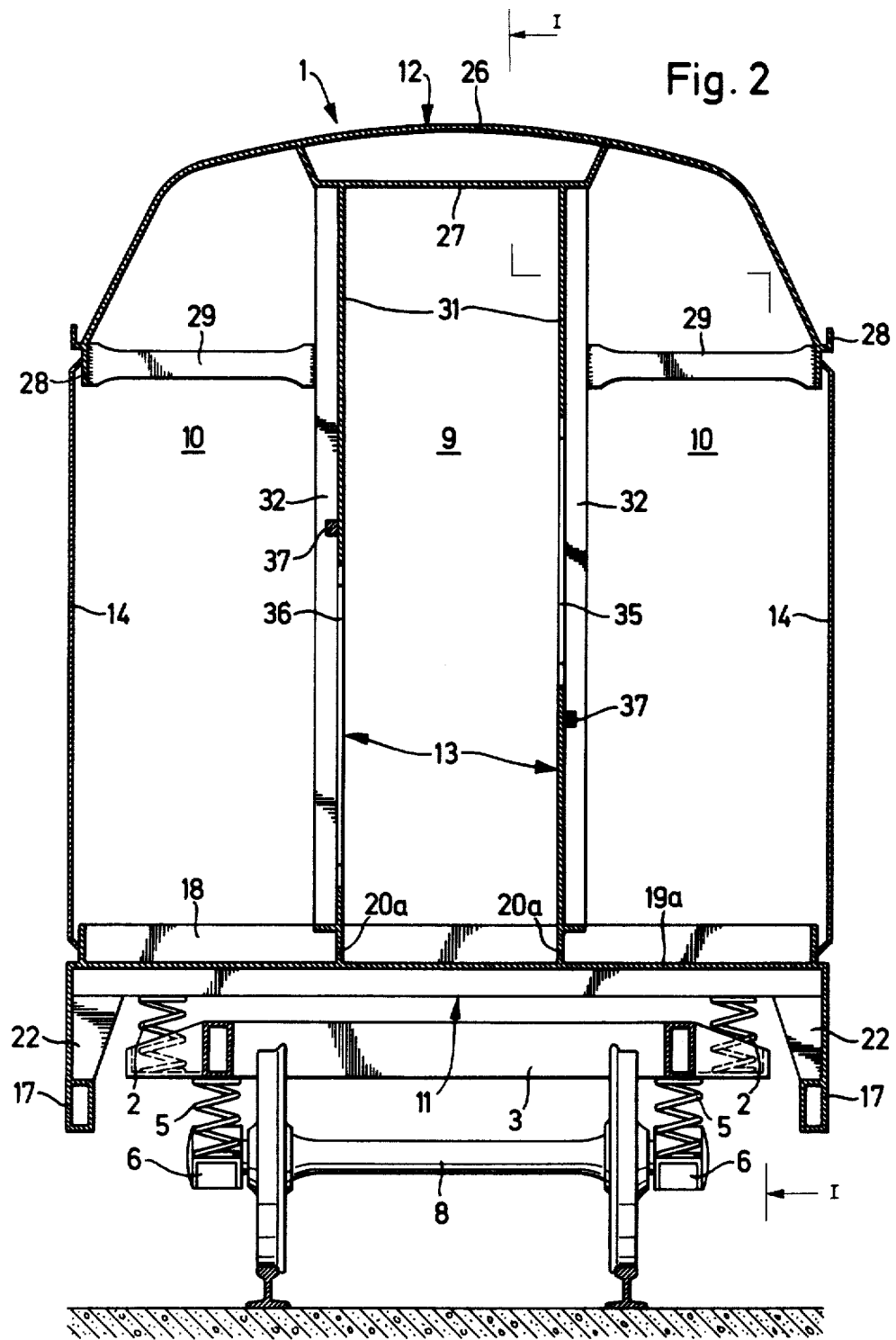
FIG. 2 illustrates a view taken on line II—II of FIG. 1.

Referring to FIGS. 1 and 2, the rail vehicle body 1 for a drive vehicle, i.e. a locomotive, is carried via side springs 2 on the frames of two bogies 3, 4 as is known. The bogie frames, in turn, are each carried via springs 5 on axle bearings 6 of two wheel sets 7, 8.

The rail vehicle body comprises a base or bottom 11, a roof 12, and a pair of load bearing frames 13 which are operatively secured to and between the base 11 and roof 12 to define a unitary bearing section member. As shown, the bearing frames 13 are disposed within the middle third of the vehicle body width in parallel to the longitudinal center plane of the body (FIG. 2) and define a walkway 9 therebetween. In addition, the load bearing frames 13 subdivide the body lengthwise into two lateral working chambers 10 to opposite sides of the bearing frame 13.

The rail vehicle body also has a pair of non-load-bearing side walls 14 removably mounted between the base 11 and the roof 12 longitudinally of the vehicle body 1. These side walls 14 are releaseably secured to the base 11 and roof 12 by suitable means (not shown). In addition, a frontal wall 15 is connected to the base 11 and roof 12 at both ends of the body.

The base 11 comprises a frame which is formed by two transverse ends or girders 16 (FIG. 1) and two side girders 17. This frame is carried on the springs 2 via two girders 18 which interconnect the side girders 17. These two girders 18 are interconnected by a base plate 19 and two longitudinal girders 20 and are each connected by a base plate 19a and two longitudinal girders 20a to the adjacent end girder 16. Each of the girders 20, 20a is formed with an angle section (see FIG. 2). The base plates 19, 19a are reinforced by transverse girders 20, 21' and 21a. The girders 18, 21, 21', 21a are secured to the side girders 17 by brackets 22, 23.

The roof 12 is comprised of a curved roof plate or sheet 26 which covers the whole vehicle body 1 and which has depending longitudinal edges. The plate 26 is connected to a roof girder 27 disposed longitudinally and centrally of the roof plate 26 and which is reinforced by two longitudinal edge girders 28. The edge girders 28 are connected to the adjacent bearing frame 13 via transverse expansion plates 29 which are resilient lengthwise to the body in the manner of socket stantions. The horizontal plates 29 which are longitudinally spaced may either be resilient or may be resiliently mounted lengthwise of the bearing frame 13. The base 11, roof 12, load bearing frame 13 and plates 29 define a unitary load-bearing section member of generally I-shaped cross-section as viewed in FIG. 2.

The bearing frames 13 each comprise a vertically disposed continuous longitudinal wall 31 which is rigidly connected to the longitudinal girders 20, 20a of the base and to the roof girder 27. In addition, the frames 13 each include box section vertically disposed posts 32, 32a for stiffening the respective walls 31. The posts 32, 32a are disposed near the girders 18, 21, 21', 21a. The two longitudinal walls 31 extend between two transverse walls 33 which are disposed near the transverse girders 21a and the posts 32a in order to separate two driving cabs from the central walkway 9 and the chambers 10. One of the plates 29 is secured to each of the posts 32, 32a.

Each of the longitudinal walls 31 is formed with passage and/or service apertures 34, 35, 36 in order to communicate the chambers 10 with each other. The walls 31 are strengthened in the areas where the apertures 35, 36 are disposed by strengthening ribs 37 in order to compensate for the reduction of the bearing cross section caused by the apertures 34 (see FIG. 1).

Each of the side walls 14 can be adapted, as a whole, or in various parts, to be removable for upward hinging in the manner of a door or to be movable, for example, in the manner of sliding doors. Correspondingly, components which are required within the vehicle body 1, particularly traction equipment components, can be introduced quite simply from the side once the side walls 14 have been removed or opened. The side walls 14 can be readily removed and replaced for any servicing and repair work which becomes necessary. Further, the chambers 10 of the vehicle body 1 are accessible at any time from the central gangway 9 via the apertures 34, 35, 36.

Figure 3:
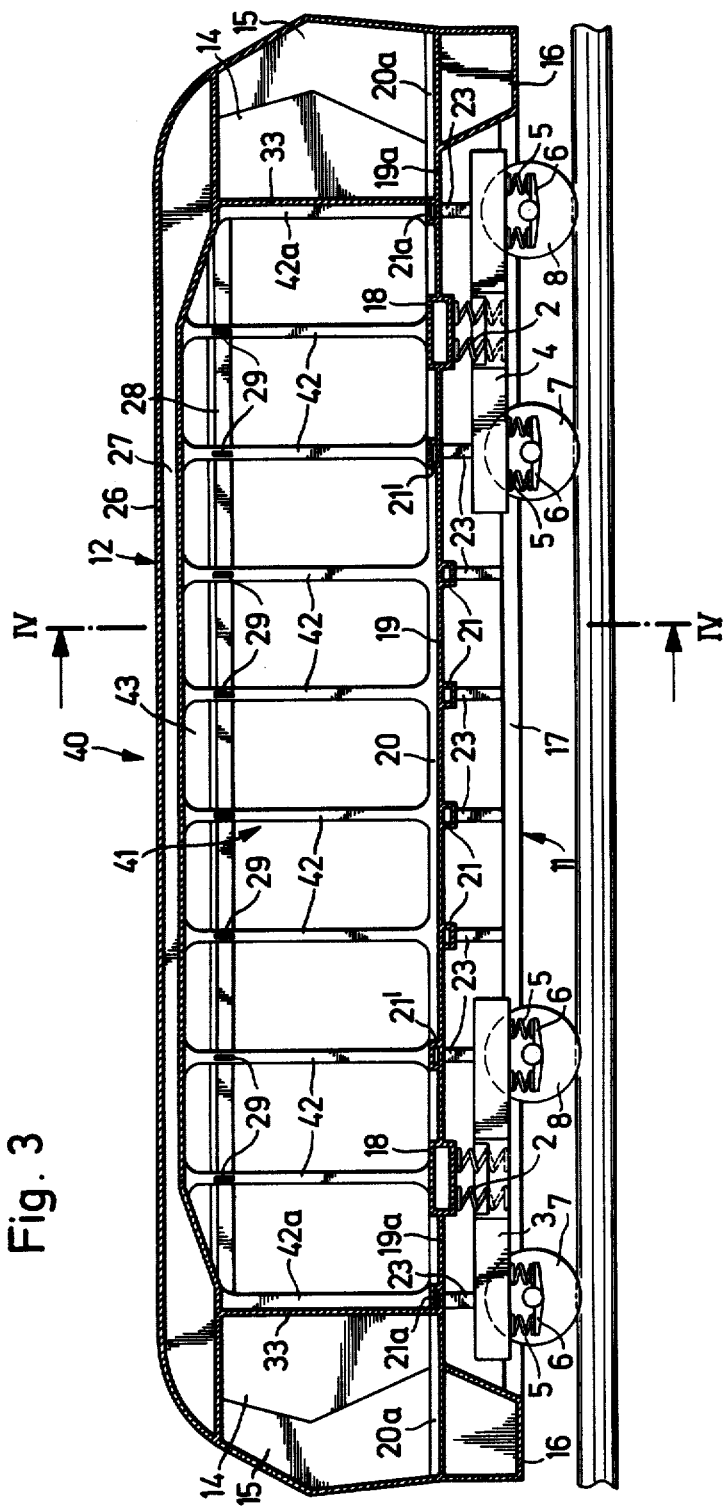
FIG. 3 illustrates a longitudinal cross-sectional view taken on line III—III of FIG. 4 of a further rail vehicle body constructed in accordance with the invention.
Figure 4:
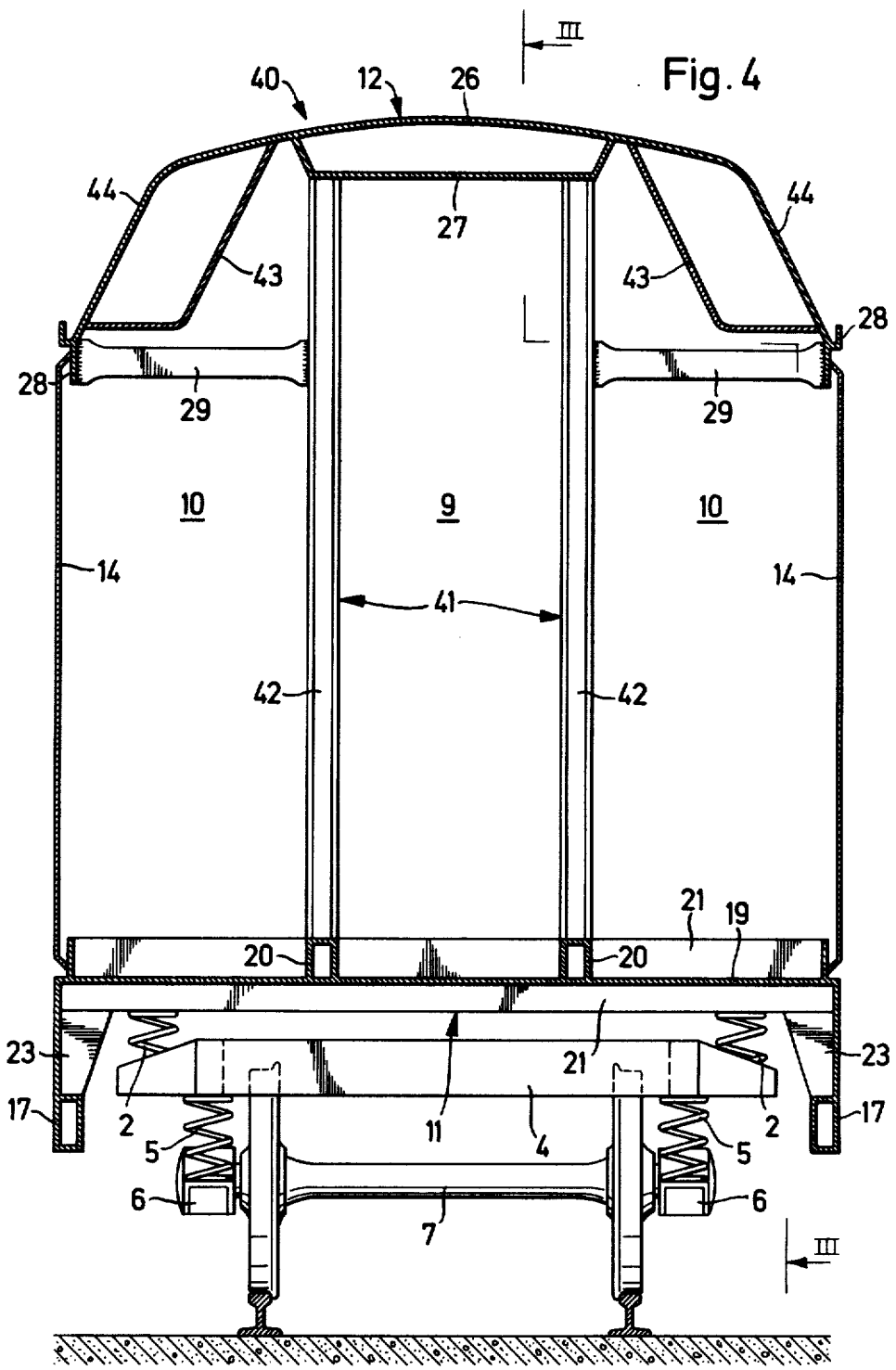
FIG. 4 illustrates a view taken on line IV—IV of FIG. 3.

Referring to FIGS. 3 and 4, wherein like reference characters indicate like parts as above, the rail vehicle body utilizes a pair of bearing frames 41 which are constructed in the manner of the web of a quadrilateral girder. As shown, the bearing frames 41 are defined by a plurality of vertically disposed posts 42, 42a which are disposed in spaced-apart relation and which are connected to the roof girder 27 and to the corresponding longitudinal girders 20, 20a of the base 11 near one of the girders 18 or near the transverse girders 21, 21', 21a in a manner to resist bending. In this construction, both the longitudinal girders 20, 20a and the posts 42, 42a are all of box section. The spacing between the posts affords a free access to the chambers 10 from the central walkway 9 over the whole length of the bearing frames 41. As shown in FIG. 4, the roof 12 has two bent wall parts 43 which extend on both sides over the length of the roof and are each connected with the roof plate 26 to form an air passage 44.

Figure 5:
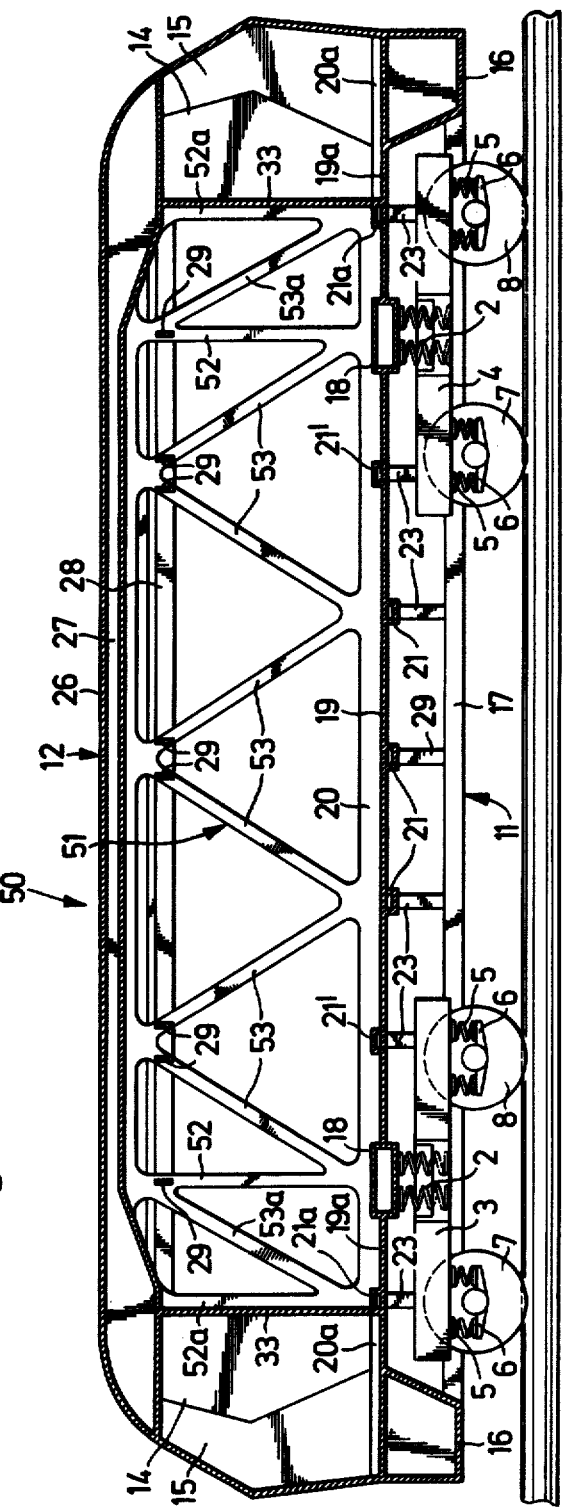
FIG. 5 illustrates a longitudinal cross-sectional view of a further rail vehicle body constructed in accordance with the invention.

Referring to FIG. 5, wherein like reference characters indicate like parts as above, the rail vehicle body has a pair of load-bearing frames 51 which are formed in the manner of a lattice girder. That is, each bearing frame 51 is formed with vertical struts 52, 52a and angularly disposed or diagonal struts 53, 53a. Each bearing frame 51 is connected to the roof girder 27 and to one of the longitudinal girders 20 which extend beyond the bearing girders 18 of the base 11. The spaces between the status of each bearing frame 51 provide ready access to the chambers 10 from a central walkway 9 (not shown) between the bearing frames 51.

Figure 6:
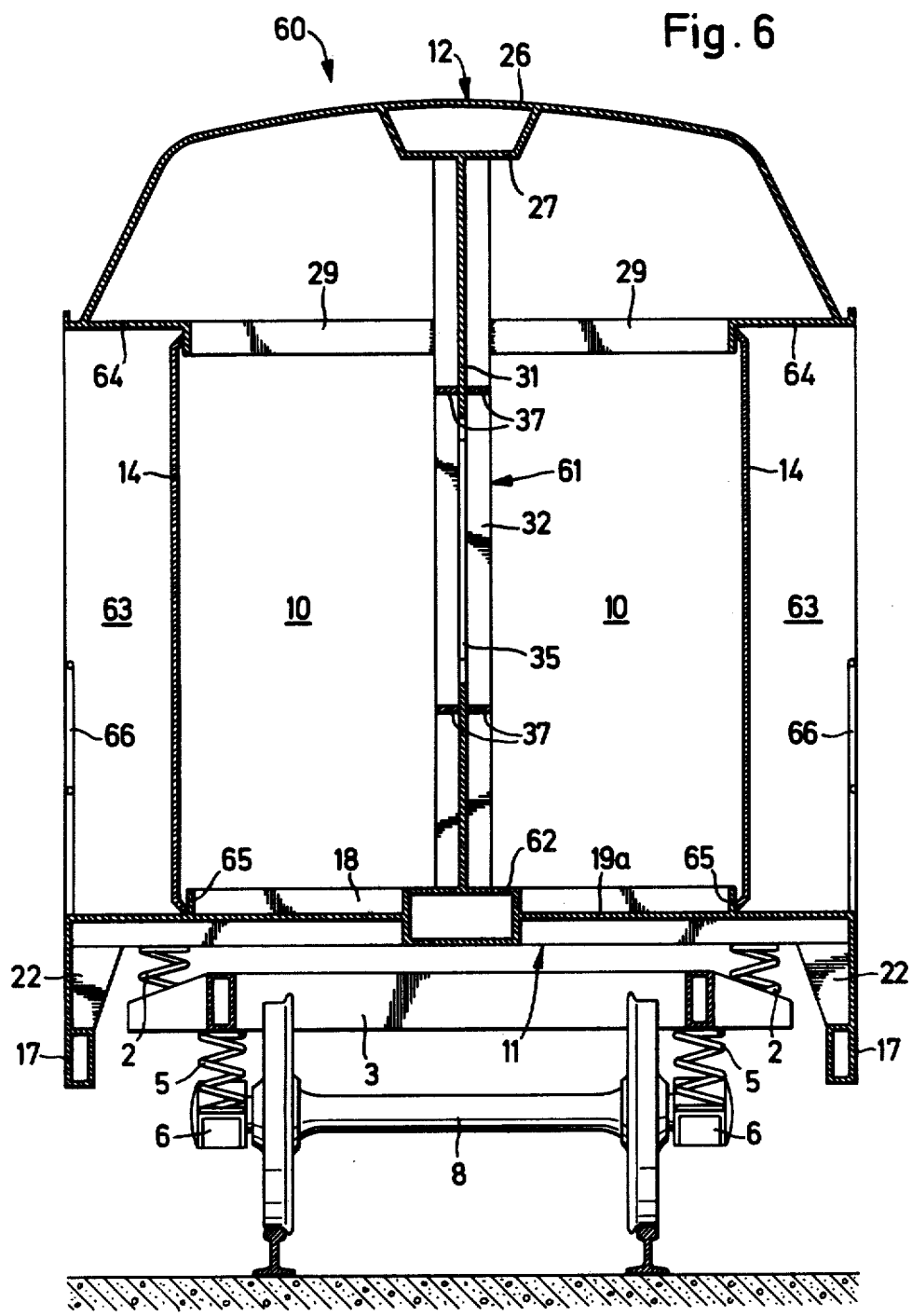
FIG. 6 illustrates a transverse cross-sectional view of a further modified rail vehicle body constructed in accordance with the invention.

Referring to FIG. 6, wherein like reference characters indicate like parts as above, the rail vehicle 60 may be constructed with a single load-bearing frame 61 disposed on or near the longitudinal centerplane. In this case, the bearing frame 61 comprises a continuous longitudinal wall 31 which is strengthened by posts 32 and ribs 37. The posts 32 are disposed near the girders 18 and the other transverse girders (not shown in FIG. 6) and are secured thereon on both sides. The longitudinal wall 31 is secured directly to the roof girder 27 and to a single longitudinal girder 62 of the base 11. The side walls 14 of the vehicle body are each offset by the width of a side gangway or walkway 63 from the outside contour of the vehicle body 60 towards the bearing frame 61. Further, each side wall 14 is secured to an edge girder 64 which covers the side walkway 63 and to an edge strip 65 so as to removable and/or displaceable. As indicated, each of the side walkways 63 has a handrail 66. This construction is of use, for example, for special cases, and particularly for tropical or correspondingly different operating conditions and where only minor torsional stressing of the vehicle body has to be compensated.

Other embodiments of the rail vehicle construction are also possible. For example, in the embodiment in which only a single bearing frame is used, the frame can be embodied as a quadrilateral beam or lattice girder. Also, the roof can be reinforced by rigid socket beams instead of resilient plates; the socket beams being so connected, for example, pivotally to the bearing frame so as to be movable lengthwise.

Further, referring to FIGS. 7 and 8, the rail vehicle body may be constructed for use as an A.C. current locomotive. In this case, a part of the traction equipment for driving the wheels of the vehicle body can be suspended from the transverse girders of the base 11. For purposes of simplicity, only the transformer 71 of the traction equipment is illustrated. As shown, the transformer 71 is housed in a suspended manner within the base 11. The girders 21 serve to support the transformer 71 via suitable bolts.

The suspended arrangement of the transformer 71 allows the use of the rail vehicle body in vehicle types which have traction equipment whose arrangements do not allow insertion through the subdivided body construction. Apart from this, the suspension of parts of the traction equipment from the underside of the base 11 causes a lowering of the center of gravity of the vehicle. This is especially advantageous to the stability of the vehicle.

What is claimed is:

1. A rail drive vehicle body comprising
a base;
a roof having a plate covering the whole of the vehicle body;
at least one load-bearing frame secured to and between said base and said roof, said bearing frame being disposed within the middle third of the rail vehicle body width and extending longitudinally of the body, said base, roof and bearing frame defining a unitary load bearing section member;
a plurality of transversely disposed longitudinally spaced horizontal expansion plates connected to and between respective edges of said roof plate and said bearing frame; and
a pair of mounted side walls disposed between said base and said roof longitudinally of the rail vehicle body.

2. A rail drive vehicle body as set forth in claim 1 wherein said load bearing frame and said side walls define at least a pair of chambers, said chambers being disposed on opposite sides of said bearing frame, and wherein said bearing frame has apertures therein to form passage and service apertures to communicate said chambers with each other.

3. A rail drive vehicle body as set forth in claim 1 wherein said bearing frame includes a vertically disposed wall connected to said base and to said roof.

4. A rail drive vehicle body as set forth in claim 1 which comprises a pair of said bearing frames disposed in spaced parallel relation to define a walkway therebetween.

5. A rail drive vehicle body as set forth in claim 1 wherein said plates are resilient.

6. A rail drive vehicle body as set forth in claim 1 wherein said expansion plates are resilient lengthwise of said bearing frame and rigid in a vertical plane.

7. A rail drive vehicle body as set forth in claim 1 wherein said base includes transverse girders and which further comprises traction equipment for driving wheels of the vehicle body, at least one part of said equipment being suspended from said transverse girders centrally of the length of the rail vehicle body.

8. A rail drive vehicle body as set forth in claim 1 wherein said roof plate is curved to define depending longitudinal edges, and said roof has a roof girder connected to and centrally of said roof plate, and a longitudinal edge girder at each respective longitudinal edge of said roof plate; each said edge girder being connected to a respective end of a plurality of said expansion plates.

9. A rail drive vehicle body comprising
a base extending over the width of the vehicle body;
a roof having a curved plate with depending longitudinal edges covering the whole of the vehicle body;
at least one load-bearing frame secured to and between said base and said roof, said bearing frame being disposed within the middle of the rail vehicle body width and extending lontidudinally of the body;
a plurality of transversely disposed longitudinally spaced horizontal expansion plates connected to and between respective edges of said roof plate and said bearing frame;
said base, roof, bearing frame and plates defining a unitary load bearing section of generally I-shaped cross-section; and
a pair of mounted side walls disposed between said base and said roof longitudinally of the rail vehicle body.

10. A rail drive vehicle body comprising
a base extending across the width of the vehicle body;
a roof having a plate covering the whole of the vehicle body;
at least one load-bearing frame secured to and between said base and said roof, said bearing frame being disposed within the middle third of the rail vehicle body width and extending longitudinally of the body,
said base, roof and bearing frame defining a unitary bearing section member;
a plurality of transversely disposed longitudinally spaced horizontal stiffening plates connected to and between respective edges of said roof plate and said bearing frame, said plates being vertically rigid and stiff, and resilient lengthwise to the vehicle body whereby the entire roof is operative as a bearing element; and
side walls removably mounted between said base and said roof longitudinally of the rail vehicle body.

11. A rail drive as set forth in claim 10 wherein said roof has a curved roof plate extending over the width of the vehicle body.

* * * * *